UNITED STATES PATENT OFFICE.

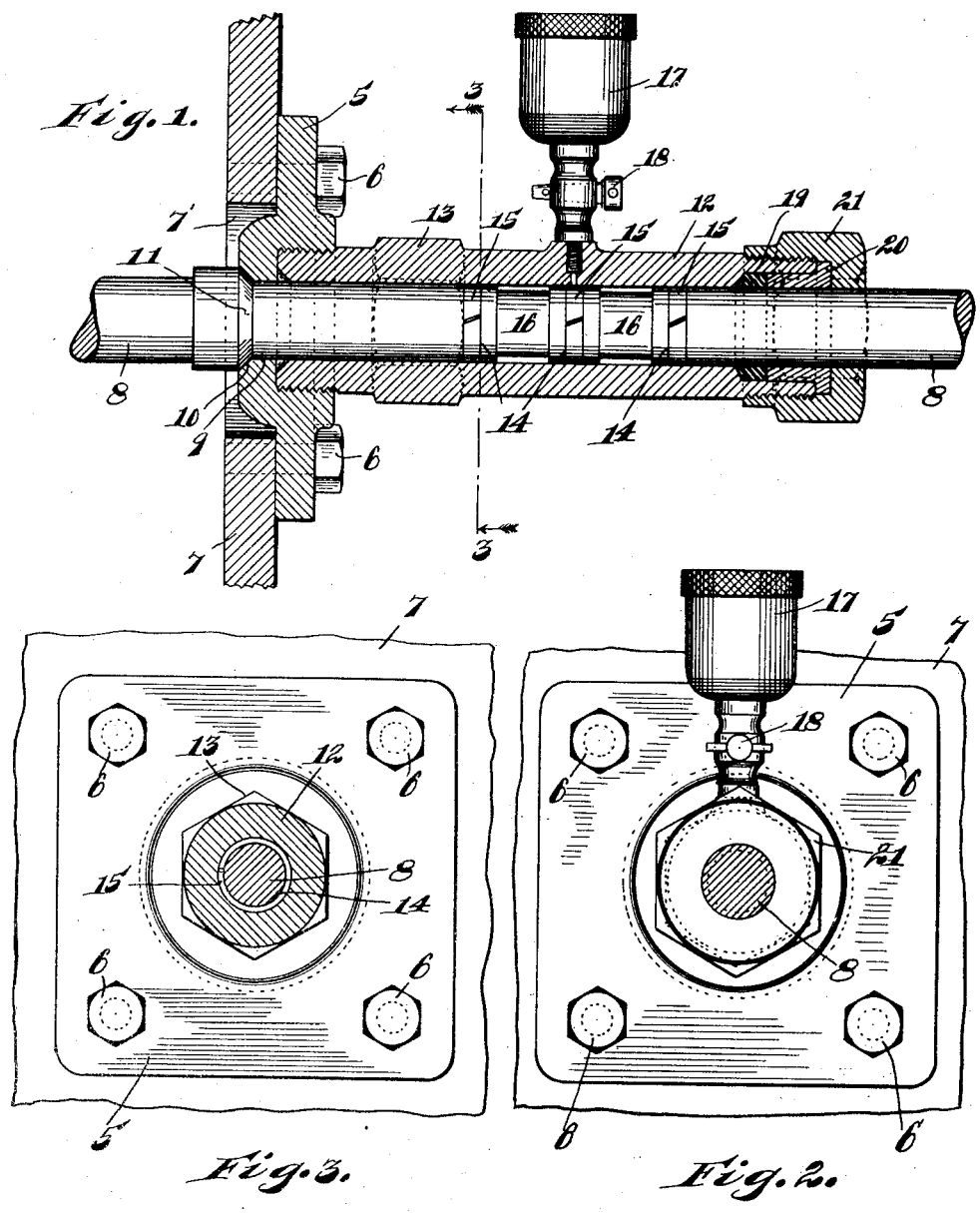

JAMES SHELTON, OF KNOXVILLE, TENNESSEE.

VALVE-STEM STUFFING-BOX.

1,352,548.　　　Specification of Letters Patent.　　Patented Sept. 14, 1920.

Application filed October 16, 1917. Serial No. 196,880.

*To all whom it may concern:*

Be it known that I, JAMES SHELTON, a citizen of the United States, and a resident of the city of Knoxville, county of Knox, and State of Tennessee, have invented certain new and useful Improvements in Valve-Stem Stuffing-Boxes, of which the following is a specification.

My invention relates to valve-stem stuffing boxes, and more especially to stuffing boxes of this character, designed for use especially in connection with the throttle stem of a locomotive.

The object of my invention is the production of a stuffing box of the character mentioned, whereby the valve-stem may be repacked or the packing therein renewed or removed without causing cessation in the operation of the locomotive, that is, withdrawing the fire from the boiler to reduce the pressure of steam within the boiler.

A further object is the production of a stuffing box, as mentioned, which will be provided with novel means of lubrication.

Other objects will appear hereinafter.

The invention consists in the combinations and arrangements of parts hereinafter described and claimed.

The invention will be best understood by reference to the accompanying drawings forming a part of this specification, and in which, Figure 1 is a central vertical section through a boiler plate showing a valve-stem projecting therethrough, in connection with which is shown a stuffing box, embodying the invention, Fig. 2, a front elevation of the construction seen in Fig. 1, and Fig. 3, a section taken on line 3—3 of Fig. 1.

The preferred form of construction as illustrated in the drawings comprises a collar 5, which is adapted to be secured by bolts 6 to the boiler plate 7, over a throttle-stem opening 7' therein. The throttle stem 8 passes loosely through a central circular opening 9 formed in collar 5, said collar, at its inner side, surrounding said opening, being formed with a valve-seat 10, which is adapted for engagement by a valve-surface 11 provided upon stem 8, as clearly seen in Fig. 1.

In detachable threaded connection with the outer side of collar 5 is a tubular stuffing box or sleeve 12, through which the stem 8 slidably passes. Said member 12 is formed adjacent the inner end thereof with a hexagonal enlargement 13 for engagement of a wrench or other tool, to facilitate rotation and hence detachment of the same from collar 5. The portion of the stem 8 registering with the member 12 is formed with spaced circumferential grooves 14, in which are arranged split, metallic packing rings 15 which are adapted to press outwardly against the inner surface of member 12 and thus serve to maintain an exceptionally tight connection. Between the packing ring grooves 14, are formed circumferential oil grooves 16, adapted to receive oil from an oil cup 17, mounted upon the upper side of stuffing box 12. The flow of oil from said oil cup is controlled by a suitable valve or cock 18.

In the outer end of stuffing box 12, surrounding the stem 8, is provided a suitable packing 19, held in place by a gland 20, which, in turn, is held in position by a cap nut or collar 21.

With the construction, as described, it will be seen that when it is desired to remove or replace packing rings 15, the stem 8 is shifted to its outward position, or to a position in which the valve-surface 11 seats upon the valve-seat 10. This will obviously serve to retain the pressure in the boiler, preventing any escape around the throttle-stem, so as to permit of unthreading of the stuffing box and sliding of the same outwardly, in order to gain access to said packing rings 15. The packing rings having been replaced or repaired, as desired, the stuffing box may again be slid back to its position over said packing rings, and threaded into the collar 5, all without losing any of the pressure of the boiler. The packing 19 may be renewed, without disturbing the stuffing box, simply by removing the nut or collar 21 and the gland 20. The arrangement described also permits of ready access being gained to the oil grooves for cleaning of the same, without loss of pressure of the boiler, such oil grooves being accessible at the same time that access is gained to the packing rings 15, as above described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination of a collar having an opening therethrough, said collar having a valve seat at one side and a threaded recess at its other side surrounding said opening; a throttle stem and a valve carried thereon, said stem passing through said opening and said valve being adapted to seat in said valve seat; a tubular stuffing box detachably threaded into said recess and projecting outwardly from said collar and through which said stem slidably passes; packing elements disposed on said stem intermediate the ends of said stuffing box; a gland adapted to seat in a recess in the outer end of said stuffing box, said end of said stuffing box being exteriorly threaded; and an interiorly threaded cup through which said stem projects, said cup being threaded upon the threaded recessed end of said stuffing box and securing said gland in position in said recess, substantially as described.

2. The combination of a collar having an opening therethrough, said collar having a valve seat at one side and a threaded recess at its other side surrounding said opening; a throttle stem and a valve carried thereon, said stem passing through said opening and said valve being adapted to seat on said valve seat; a tubular stuffing box detachably threaded into said recess and projecting outwardly from said collar and through which said stem slidably passes; packing elements disposed on said stem intermediate the ends of said stuffing box; and a packing element surrounding said stem and carried at the outer end of said stuffing box, substantially as described.

In testimony whereof I have signed my name to this specification in the presence of two subscribing witnesses.

JAMES SHELTON.

Witnesses:
 GEO. LARMAN,
 J. C. GLAZE.